United States Patent [19]
Zakai

[11] Patent Number: 5,535,778
[45] Date of Patent: Jul. 16, 1996

[54] DRIP IRRIGATION LINES FLUSHING VALVE

[76] Inventor: Abi Zakai, 13, Yair Street, Zihron Yakov, Israel

[21] Appl. No.: 328,889

[22] Filed: Oct. 25, 1994

[30] Foreign Application Priority Data

Oct. 29, 1993 [IL] Israel .................................. 107444

[51] Int. Cl.⁶ ............................................ F16K 21/16
[52] U.S. Cl. .................................... 137/498; 251/16
[58] Field of Search ................................ 137/497, 498, 137/504, 494; 251/16

[56] References Cited

U.S. PATENT DOCUMENTS

| | | | |
|---|---|---|---|
| 1,768,305 | 6/1930 | Bentley | 251/16 |
| 3,138,174 | 6/1964 | Gilpin | 137/498 |
| 4,022,244 | 5/1977 | Oman | 137/517 |
| 4,427,174 | 1/1984 | Mehoudar | 251/16 |

FOREIGN PATENT DOCUMENTS 60774  8/1980  Israel .

*Primary Examiner*—Stephen M. Hepperle
*Attorney, Agent, or Firm*—Ostrolenk, Faber, Gerb & Soffen

[57] ABSTRACT

A self-closing valve for flushing drip-irrigation lines at the beginning of every irrigation cycle. The valve comprises a housing defining an enclosed space, having an inlet portion mountable to the line end, allowing free communication with the water of the line. The housing comprises an elastic membrane dividing the enclosed space into upstream and downstream compartments with respect to said flow, with a passage communicating between the said compartments. A discharge opening is formed in the upstream compartment. Flow impeding means are associated with said passage for restricting the flow of water from the upstream compartment into the downstream compartment, said flow being effective to flex the membrane in the upstream direction until it closes against the discharge opening.

14 Claims, 4 Drawing Sheets

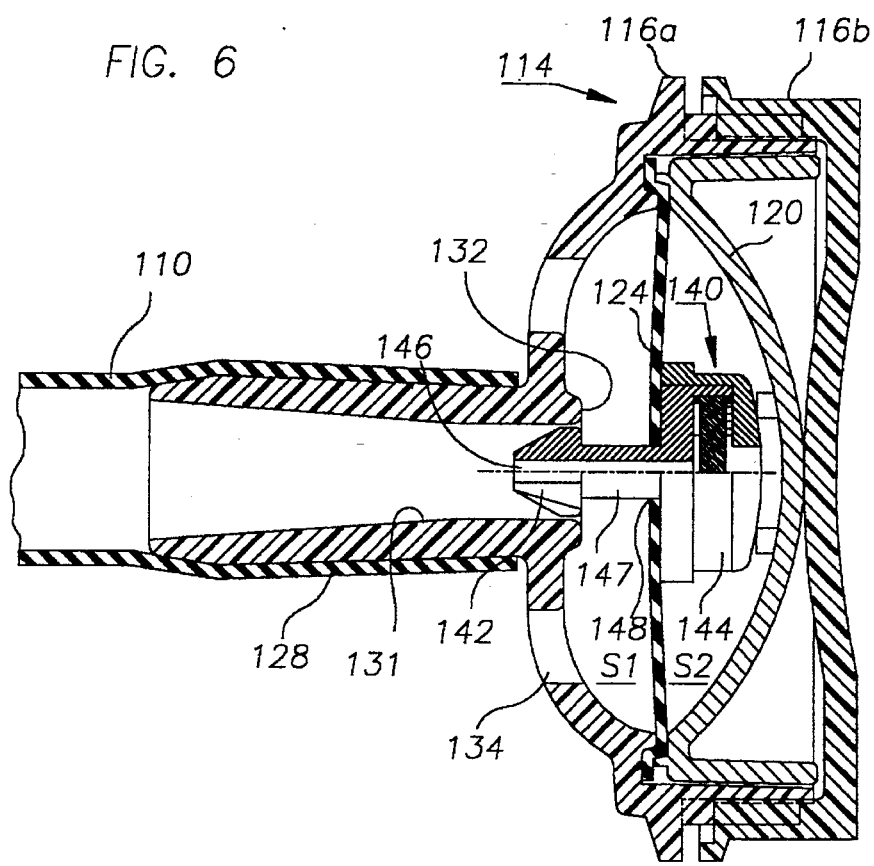
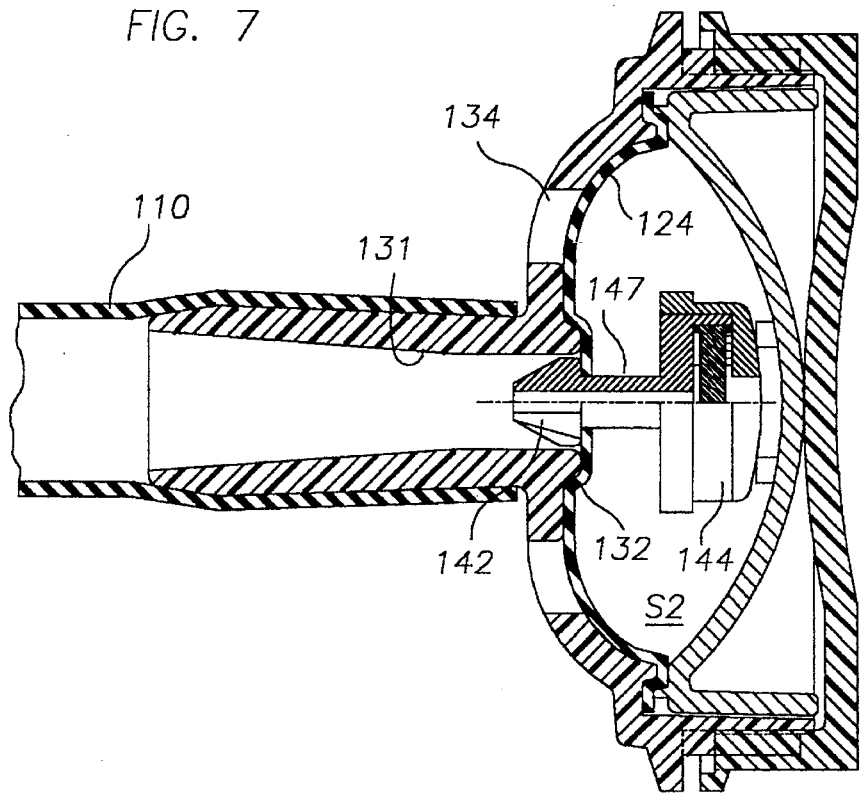

5,535,778

DRIP IRRIGATION LINES FLUSHING VALVE

FIELD OF THE INVENTION

The present invention relates to irrigation systems, in particular to drip-emitters irrigation lines. Still more specifically the invention concerns self-closing flushing valves that are installed at the end of the irrigation line for effecting flushing of the line at the beginning of every irrigation cycle, thus avoiding the clogging of the emitters through removal of particles, sediments and other impurities from the water.

BACKGROUND OF THE INVENTION

Self-closing flushing valves for the purposes above described are known. For example, in Israel Patent No. 60774 there has been disclosed a flushing valve based on the coaction between a pair of membranes, one controlling the outlet of a flush water discharge outlet, and the other responsive for closing the first membrane after a certain pressure has been built-up between the membranes.

This type of flushing valves suffers from numerous disadvantages, mainly and in that its operation is based on a pressure equilibrium condition, which is difficult to preset and is liable to be effected by different operating conditions of the line, e.g. pressure, amount of flow, etc. Furthermore, the structure is based on an in-line emitter unit installed therein, and generally comprises a relatively large number of components some of which are of non-standard design and therefore is rather costly in production.

It has also been proposed to provide flushing valves such as disclosed in U.S. Pat. No. 4,022,244, which are based on the principle of pressure triggering operation, namely such that it enters into operation upon a certain, nominal pressure prevailing in the line, and shuts-off when the pressure drops below the operative level. The operation of these valves is of course conditional upon reaching the predetermined operating pressure, which, in turn, cannot be completely guaranteed under normal, field working conditions.

It is thus the general object of the present invention to provide a flushing valve of the above type that will overcome the disadvantages of the prior art valves.

It is a further object of the invention to provide a flushing valve, the operation thereof being independent of the availability of initial and/or ultimate pressure conditions.

It is a still further object of the present invention to provided a flushing valve of a simple, straightforward structure with minimum number of components.

It is a still further object of the present invention to provided a flushing valve suitable for lines of standard, stick-in drip-irrigation emitter units.

SUMMARY OF THE INVENTION

Thus provided according to the invention is a self-closing valve for flushing drip-irrigation lines at the beginning of every irrigation cycle. The Valve comprises a housing defining an enclosed space, having an inlet portion mountable to the line end, allowing free communication with the water of the line. The housing comprises an elastic membrane dividing the enclosed space into upstream and downstream compartments with respect to said flow, with a passage communicating between the said compartments. A discharge opening is formed in the upstream compartment. Flow impeding means are associated with said passage for restricting the flow of water from the upstream compartment into the downstream compartment, said flow being effective to flex the membrane in the upstream direction until it closes against the discharge opening.

According to one preferred embodiment of the invention, means are provided for increasing the velocity of the water flow and directing same towards the passage.

According to an alternative embodiment the said flow impeding means comprise a labyrinth-type drip-emitter element mounted to the membrane.

BRIEF DESCRIPTION OF THE DRAWINGS

These and other features and advantages of the invention will become more clearly understood in the light of the ensuing description of two preferred embodiments of the invention, given by way of example only, with reference to the accompanying drawings, wherein

FIG. 6 is a cross-sectional view of the flushing valve according to a second embodiment of the invention, in its open position; and FIG. 7 shows the valve of FIG. 6 in its closing position.

DETAILED DESCRIPTION OF THE PREFERRED EMBODIMENTS

Figure 1:
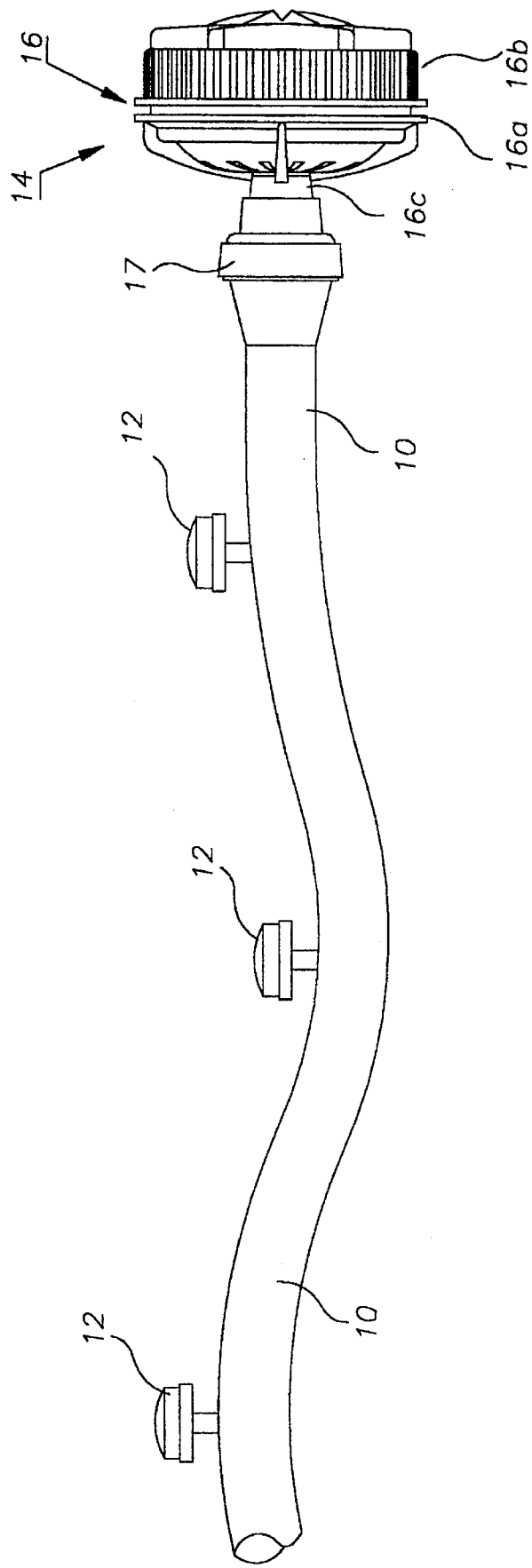
FIG. 1 is a general, schematic representation of a typical drip-irrigation line with a flushing valve installed at its end.

Referring to FIG. 1, there is schematically shown a typical irrigation line 10, provided with a series of distanced stick-in drip-emitters 12 of any known type. To the free end of the line 10 there is mounted flushing valve 14, generally comprising a two-parts housing 16 comprising an upstream portion 16a and a downstream portion 16b. The housing 16 is mounted to the line by an inlet portion 16c, possibly fastened by a clamp or band 17.

Figure 2:
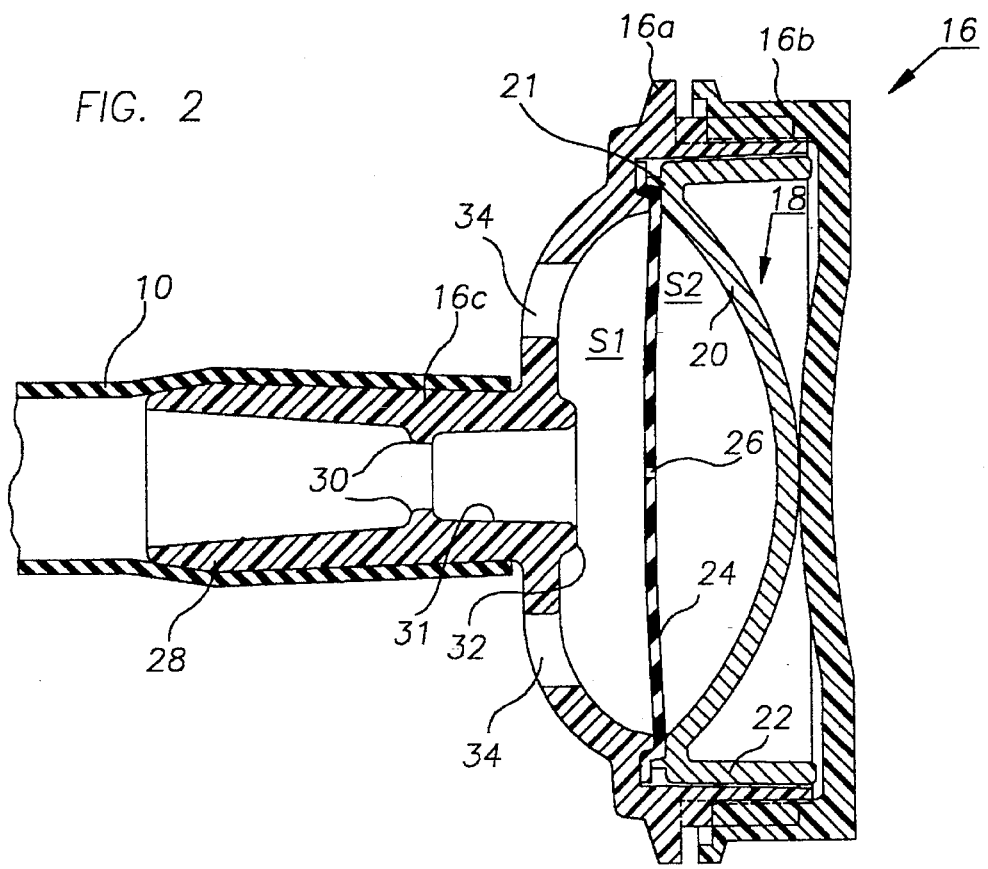
FIG. 2 is a longitudinal cross-section of a flushing valve according to a first embodiment of the invention, in its open position.

Referring now to FIG. 2, the housing 16, comprising the portions 16a and 16b and attachment inlet portion 16c , is of a generally cylindrical configuration, made of plastics. Housing portion 16b is threadably mounted to the portion 16a (and 16c ) as shown. Within the housing portion 16a there is accommodated a dish-like member 18, having a concave portion 20, a projecting rim or lip 21 and a cylindrical portion 22. The member 18 loosely fits into the interior of portion 16a, and secured when the cover-like portion 16b is screwed-on to the portion 16a.

A circular, flexible membrane 24, with a central passage in form of an orifice 26 is clamped by the lip 21 and thus suspended within the housing 16. Thus defined are a first, upstream, enclosed compartment S1 and a second, downstream, enclosed compartment S2, communicated to each other by the orifice 26.

The housing inlet portion 16c is sleeve-like, denoted 28, adapted to be simply inserted into the free end of the irrigation line 10 (see FIG. 1). It further comprises a restricted flow passage or throat portion 30, extended by tubular portion 31 which terminates with a budging lip 32.

Obviously, different types of flow restriction configurations, such as covergent nozzle portions and others, are readily applicable for locally causing an increased, jet-like flow of the water passing through the sleeve 28 and directing the jet towards the orifice 26.

One or more discharge openings 34 are formed at the wall of upstream housing portion 16a, being substantially larger than the orifice 26, for a purpose that will be now explained.

When first filling the line 10 with irrigation water, namely at the beginning of the irrigation cycle, water flows through the sleeve 28 and into the space S1, wherefrom it can be freely discharged through the openings 34. This constitutes the flushing operational stage of the valve.

Figure 3:
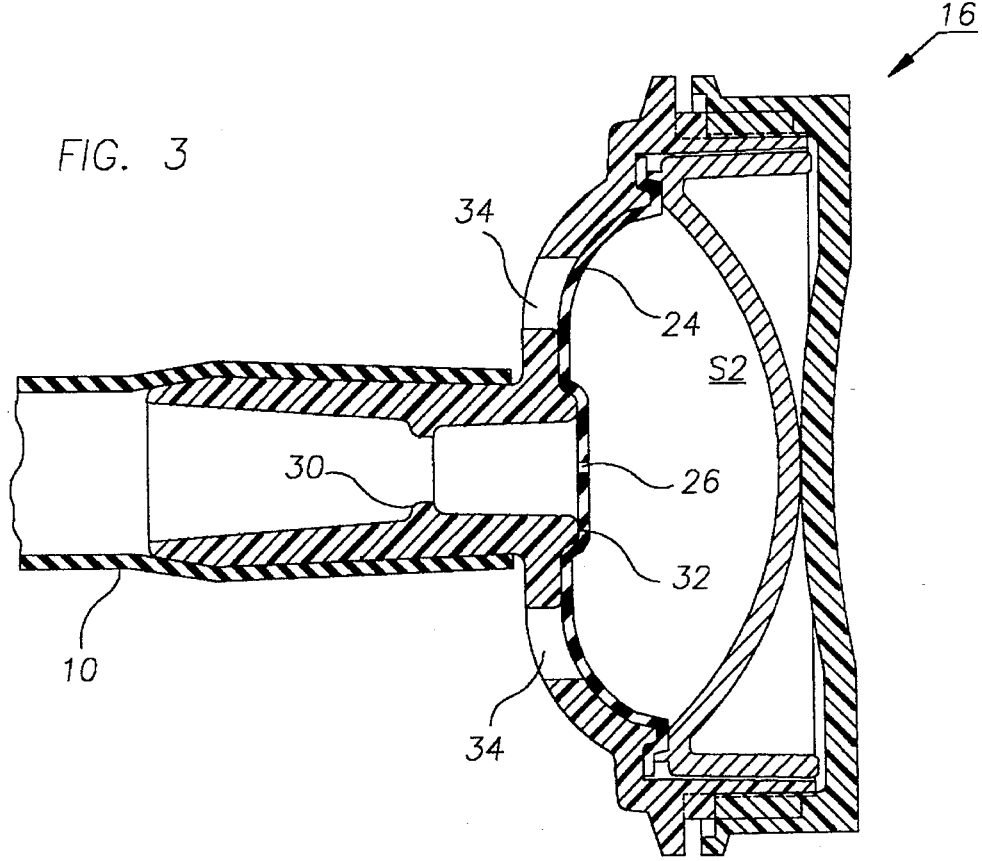
FIG. 3 shows the valve of FIG. 2 in its operative, closing position.

However, concurrently with the flush water flow, and due to the somewhat boosted or jet-like flow of water reaching the orifice 26, the downstream space S2 becomes gradually filled with water reaching same with a certain impact. Since the pressure in space S1 is practically 0, an elevated pressure is generated within compartment S2 to flex the membrane 24 until it reaches first the lip 32 (FIG. 3), and then it closes upon the discharge openings 34. Now, for as long as flow under pressure is supplied to the line 10, the valve 16 is maintained in its closing state (FIG. 3) and the flushing flow is stopped. When irrigation is discontinued, the pressure in compartment S2 will gradually drop (to zero), and under the elasticity of the membrane 24, water trapped therein will drain back through the orifice 26 and outlets 34 while the membrane reassumes its neutral, initial position (of FIG. 2).

In summary, the duration of the flushing stage is governed by the elasticity of the membrane 24, the cross-section of the orifice 26 and the amount of impact applied by the nozzle-like restriction portion 30. These parameters can be easily adjusted to conform various desired operational conditions.

Figure 4:
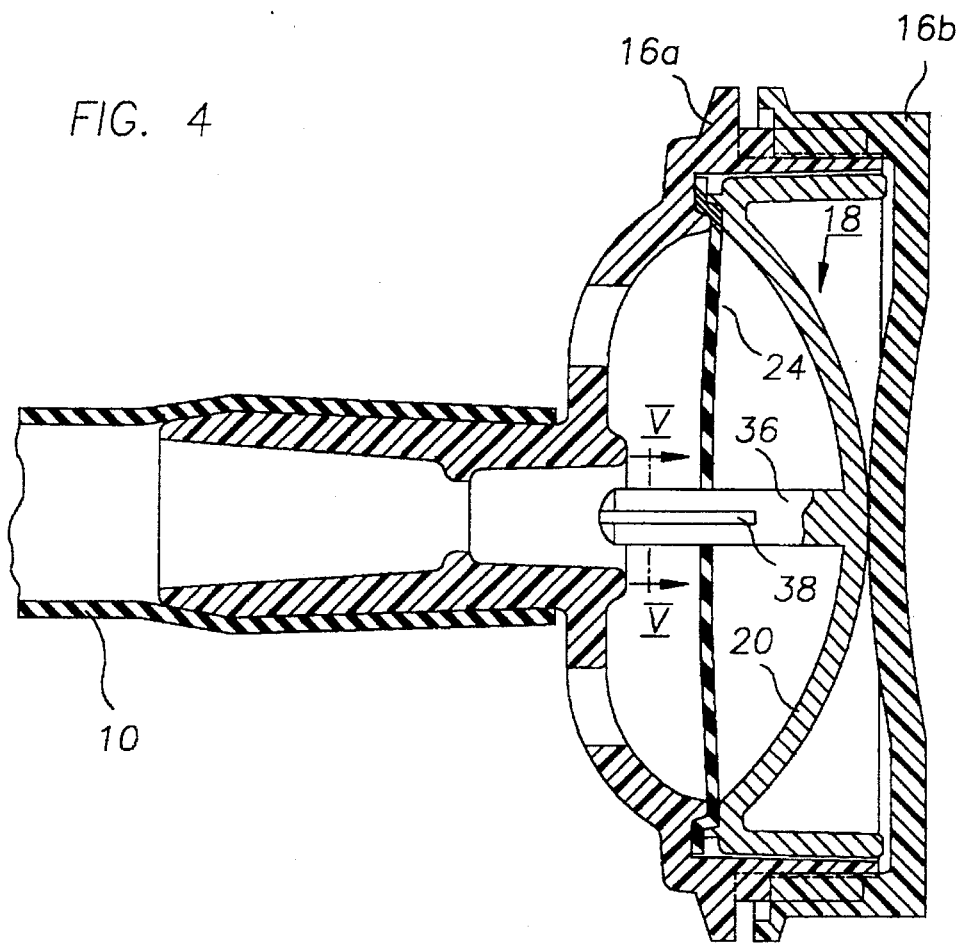
FIG. 4 is a modified embodiment of the valve of FIGS. 2 and 3.
Figure 5:
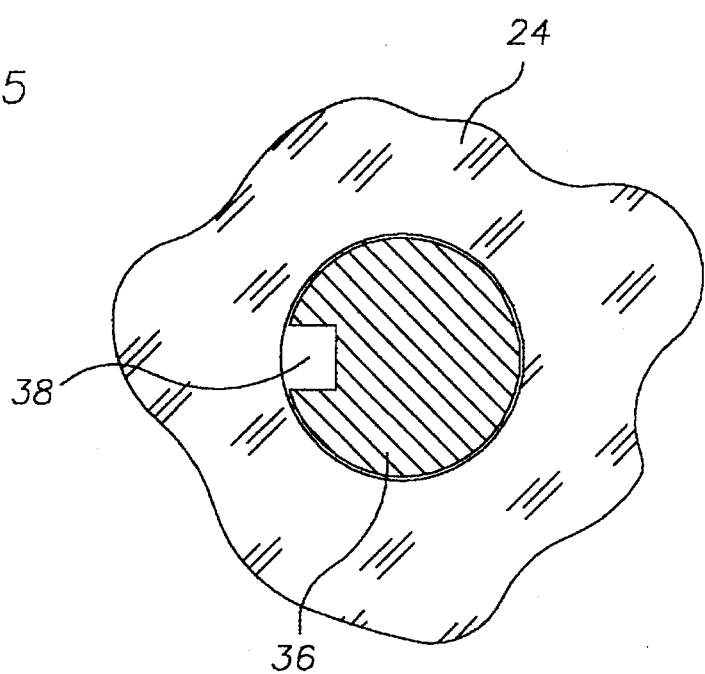
FIG. 5 is a sectional view taken along line V—V of FIG. 4, on an enlarged scale.

It may be considered advantageous, in order to avoid the possibility of the orifice 26 becoming blocked or clogged by particle matter carried by the irrigation water, to provide self-cleaning means, in the form of a needle-like pin 36—see FIGS. 4 and 5—affixed to the portion 20 of the inner cup-shaped member 18, and extending through the opening 26. The needle 36 is provided with one or more elongated recesses 38 extending therealong, at least at the region of the membrane displacement from the open into the closing positions thereof. The recess 38 thus replaces the function of the orifice 26.

Reference shall now be made to the embodiment of FIGS. 6 and 7 (wherein similar numerals have been used to denote components analogous to the parts of the former embodiment). It will be readily noted that—rather than having an orifice formed in the membrane 124, constituting the passage between the compartments S1 and S2—a standard stick-in drip-emitter 140 is used. As known and as schematically shown in FIG. 6, drip-emitter units of this type comprise a torpedo-shaped head 142 at their inlet side, and a mushroom like head 144, containing a labyrinth passage thereinside at its other end, which are communicated by a bore 146, formed through a stem 147. These details are well known and need not to be described in more detail.

The emitter 140 is affixed to the wall 120 while its stem 147 is passed through opening 148 made in the membrane 124.

The head 146 loosely fits into the downstream end 131 of the sleeve 128 (which, in this case, need not be provided with a nozzle portion (30 in FIG. 2)).

Operation of the valve 114 according to this embodiment is analogous to that of the preceding embodiment as is clearly seen in FIG. 7. Hence, again a pressure difference between compartment S1 and compartment S2 is gradually developed resulting in the closure of the membrane 124 against the budging lip 132, and thereafter against the discharge opening(s) 134.

It will be readily appreciated that the valve provided according to the teachings of the present invention is most simple in construction and maintenance and therefore superior over the prior art equivalent devices.

Those skilled in the art will readily appreciate that various changes, modifications and variations may be applied to the invention as herein exemplified without departing from the scope thereof as defined in and by the appended claims.

What is claimed is:

1. A self-closing valve for flushing drip-irrigation lines comprising a housing defining an enclosed space, and having an inlet portion mountable to the line end, allowing free communication with the water flow through the line, the housing comprising:

an elastic membrane dividing the enclosed space into upstream and downstream compartments with respect to flow of water from the line;

passage means comprising an opening formed in the membrane and communicating between the compartments;

a discharge opening from the upstream compartment;

flow impeding means associated with the passage means for restricting the flow of water from the upstream compartment into the downstream compartment so that that flow is effective to flex the membrane in the upstream direction; and means cooperating with the membrane in its upstream flexed state to close against the discharge opening while the passage means continues to communicate between the compartments.

2. The valve according to claim 1 further comprising means for increasing the velocity of the water flow from said line end and directing same towards the said passage means.

3. The valve according to claim 1 wherein the passage means opening has a cross-section substantially smaller than the cross-section of the discharge opening.

4. The valve according to claim 2 wherein the flow velocity increasing means comprise a flow restriction portion formed at the housing inlet portion, the passage means being in register with the housing inlet portion.

5. The valve as claimed in claim 4, further comprising means for preventing clogging of the membrane opening.

6. The valve as claimed in claim 5 wherein said clogging preventing means comprise a needle-like member passing the opening and being stationary relative to the membrane.

7. The valve as claimed in claim 6 wherein the needle-like member is affixed to the housing at its downstream compartment side.

8. The valve as claimed in claim 7 wherein the needle-like member is formed with a recess extending therealong for defining the passage means.

9. The valve as claimed in claim 1 wherein the housing comprises two parts threadably connectable to each other, and the membrane being clamped between the housing parts.

10. The valve as claimed in claim 1 wherein the said flow impeding means comprise a labyrinth-type drip-emitter element mounted to the membrane.

11. The valve as claimed in claim 10 wherein the element is a standard stick-in drip-emitter inserted through the membrane in register with the housing inlet portion.

12. A self-closing valve for flushing drip-irrigation lines comprising a housing defining an enclosed space, and having an inlet portion mountable to the line end, allowing free communication with the water flow through the line, the housing comprising:

an elastic membrane dividing the enclosed space into upstream and downstream compartments with respect to flow of water from the line;

a passage means comprising an opening in the membrane and communicating between the compartments;

a discharge opening from the upstream compartment;

means directing water flow from the line, through the passage means and into the downstream compartment so that that flow is effective to flex the membrane in the upstream direction; and means cooperating with the membrane in its upstream flexed state to close against the discharge opening while the passage means continues to communicate between the compartments.

13. The valve according to claim 12, including only one elastic membrane in the upstream and downstream compartments and the membrane dividing the compartments.

14. The valve according to claim 1, including only one elastic membrane in the upstream and downstream compartments and the membrane dividing the compartments.

* * * * *